US012470586B2

(12) United States Patent
Luttwak et al.

(10) Patent No.: US 12,470,586 B2
(45) Date of Patent: Nov. 11, 2025

(54) SYSTEM AND METHOD FOR RISK MONITORING OF CLOUD BASED COMPUTING ENVIRONMENTS

(71) Applicant: Wiz, Inc., New York, NY (US)

(72) Inventors: Ami Luttwak, Binyamina (IL); Yinon Costica, Tel Aviv (IL); Roy Reznik, Tel Aviv (IL); Raaz Herzberg, Tel Aviv (IL); Alon Schindel, Tel Aviv (IL); Guy Rozendorn, Tel Aviv (IL); Avihai Berkovitz, Tel Aviv (IL)

(73) Assignee: Wiz, Inc., New York, NY (US)

( * ) Notice: Subject to any disclaimer, the term of this patent is extended or adjusted under 35 U.S.C. 154(b) by 275 days.

(21) Appl. No.: 18/161,647

(22) Filed: Jan. 30, 2023

(65) Prior Publication Data

US 2023/0247044 A1 Aug. 3, 2023

Related U.S. Application Data

(60) Provisional application No. 63/267,366, filed on Jan. 31, 2022.

(51) Int. Cl.
*H04L 9/40* (2022.01)
*G06F 16/901* (2019.01)

(52) U.S. Cl.
CPC ...... *H04L 63/1433* (2013.01); *G06F 16/9024* (2019.01); *H04L 63/1441* (2013.01); *H04L 63/20* (2013.01)

(58) Field of Classification Search
CPC . H04L 63/1433; H04L 63/1441; H04L 63/20; G06F 16/9024
USPC .............................................................. 726/1
See application file for complete search history.

(56) References Cited

U.S. PATENT DOCUMENTS

| | | | |
|---|---|---|---|
| 7,072,893 B1* | 7/2006 | Rehfeld | G06F 16/9566 707/999.008 |
| 8,468,244 B2 | 6/2013 | Redlich et al. | |
| 10,917,439 B2 | 2/2021 | Puratheppparambil et al. | |
| 11,880,477 B2* | 1/2024 | Marshall | H04L 63/108 |
| 2016/0026776 A1* | 1/2016 | Hurst | H04L 9/0833 713/165 |
| 2016/0344772 A1* | 11/2016 | Monahan | G06F 16/248 |
| 2017/0295197 A1* | 10/2017 | Parimi | H04L 63/10 |
| 2018/0295154 A1 | 10/2018 | Crabtree et al. | |
| 2020/0382557 A1* | 12/2020 | Woolward | H04L 63/1441 |
| 2020/0396218 A1 | 12/2020 | Crabtree et al. | |
| 2022/0231984 A1* | 7/2022 | Wolfe | H04L 51/212 |
| 2025/0192954 A1* | 6/2025 | Gao | H04W 72/231 |

* cited by examiner

*Primary Examiner* — Glenton B Burgess
(74) *Attorney, Agent, or Firm* — M&B IP Analysts, LLC

(57) ABSTRACT

A system and method for generating a contextual cloud risk assessment of a cloud computing environment. The method includes accessing a plurality of cloud assessment policies, wherein a policy including a query executable on a security graph; applying the plurality of cloud assessment policies to the representation of the first cloud computing environment; generating a risk assessment report based on an output generated by applying a policy of the plurality of cloud assessment polices; and initiating a mitigation action based on a cybersecurity risk from the risk assessment report.

21 Claims, 5 Drawing Sheets

SYSTEM AND METHOD FOR RISK MONITORING OF CLOUD BASED COMPUTING ENVIRONMENTS

CROSS-REFERENCE TO RELATED APPLICATIONS

This application claims the benefit of U.S. Provisional Patent Application No. 63/267,366 filed on Jan. 31, 2022, the contents of which are hereby incorporated by reference.

TECHNICAL FIELD

The present disclosure relates generally to cloud computing, and more specifically to applying prioritized control policies in a cloud computing environment.

BACKGROUND

Cloud computing technologies have allowed to abstract away hardware considerations in a technology stack. For example, computing environments such as Amazon® Web Services (AWS), or Google Cloud Platform (GCP) allow a user to implement a wide variety of software and provide the relevant hardware, with the user only paying for what they need. This shared provisioning has allowed resources to be better utilized, both for the owners of the resources, and for those who wish to execute software applications and services which require those resources.

This technology however does not come without its disadvantages. As the computing environment is now physically outside of an organization, and exposed in terms of access to and from the computing environment, vulnerabilities may be more likely to occur.

While many solutions exist which attempt to block cyber-attacks, the reality is that at least some of these attacks will inevitably be successful. An attack may be, for example, unauthorized access to sensitive information, such as information stored in a database. Attacks can be categorized based on severity, for example an attack that merely allows the attacker to see that a file exists on a workload is probably less severe than an attack which allows the attacker to view, or download, that same file.

A cybersecurity vulnerability may be an indication of a potential attack path. For example, a machine that is open to accepting a connection from an external network on any port may be considered vulnerable. Likewise, having out of date software, with known vulnerabilities, may be an indication of a potential attack path. To aid in combating cyberthreats, organizations such as Common Vulnerabilities and Exposures (CVE®) exist. CVE is an example of a system which provides, as the name implies, a database of known vulnerabilities and exposures, in an attempt to categorize and identify them. This approach makes it easier for organizations to share data about known vulnerabilities and exposures, however it does not provide any indication as to what the impact is on any specific organization.

Furthermore, there is no single benchmark against which the security of any one type of cloud environment is measured, and existing tools are typically tailored to one type of environment, or type of workload.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a contextual cloud risk assessment of a cloud computing environment. The method also includes accessing a plurality of cloud assessment policies, where a policy including a query executable on a security graph; applying the plurality of cloud assessment policies to the representation of the first cloud computing environment, generating a risk assessment report based on an output generated by applying a policy of the plurality of cloud assessment polices. The method also includes initiating a mitigation action based on a cybersecurity risk from the risk assessment report.

Certain embodiments disclosed herein also include a non-transitory computer readable medium having stored thereon instructions for causing a processing circuitry to execute a process. The non-transitory computer readable medium also includes accessing a plurality of cloud assessment policies, where a policy including a query executable on a security graph; applying the plurality of cloud assessment policies to the representation of the first cloud computing environment, generating a risk assessment report based on an output generated by applying a policy of the plurality of cloud assessment polices. The medium also includes initiating a mitigation action based on a cybersecurity risk from the risk assessment report.

Certain embodiments disclosed herein also include a system for generating a contextual cloud risk assessment of a cloud computing environment. The system also includes a processing circuitry. The system also includes a memory, the memory containing instructions that, when executed by the processing circuitry, configure the system to: access a plurality of cloud assessment policies, where a policy including a query executable on a security graph; apply the plurality of cloud assessment policies to the representation of the first cloud computing environment; generate a risk assessment report based on an output generated by applying a policy of the plurality of cloud assessment polices. The system also includes initiate a mitigation action based on a cybersecurity risk from the risk assessment report.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
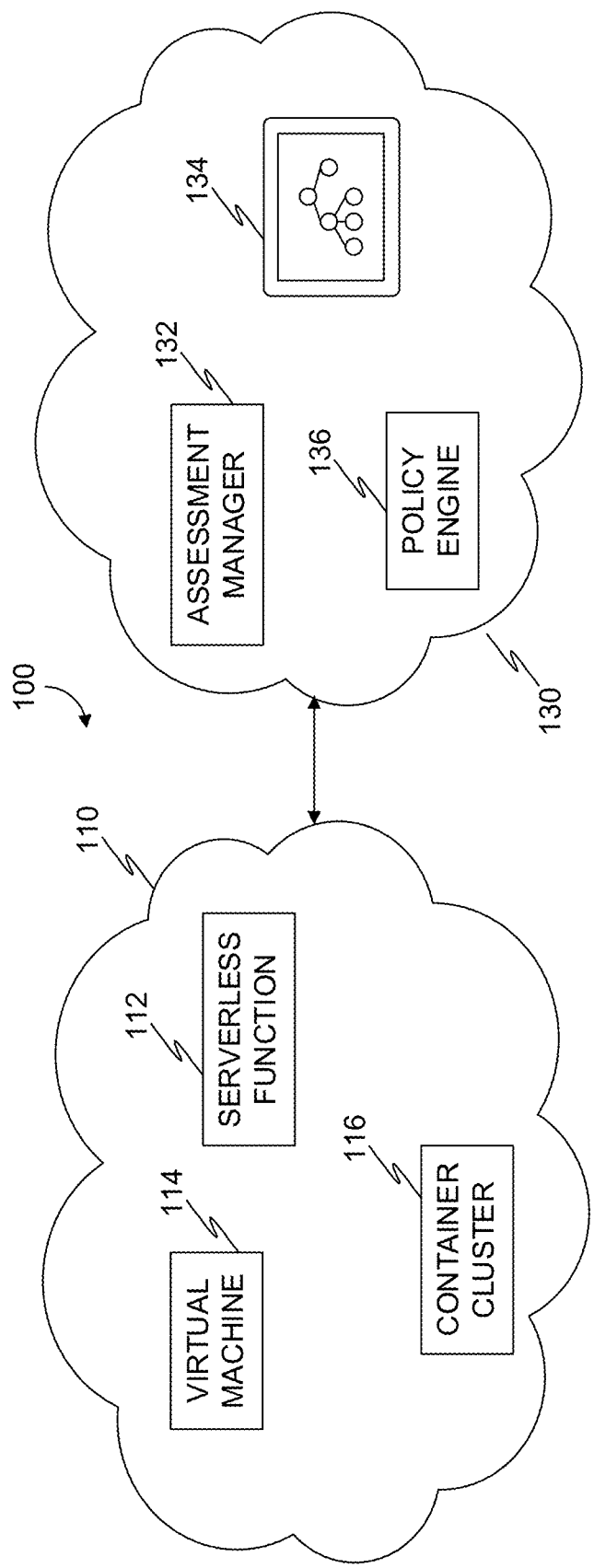
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating a contextual cybersecurity risk assessment for cloud computing environment. In certain embodiments, an organization utilizes a plurality of cloud computing environments, for example deployed over different cloud computing infrastructures. According to an embodiment, each cloud computing environment is represented in a security graph, for example by representing resources, principals, enrichments, cybersecurity objects, cybersecurity risks, and the like, as nodes in the security graph.

A policy is accessed and applied to the representation, according to an embodiment. For example, in an embodiment a policy includes a rule having a condition and a value. A query is generated for the security graph, to detect a node which satisfies the condition based on the value, in an embodiment. In some embodiments, the query is generated to detected a node which does not satisfy the condition based on the value.

Applying a policy to a representation of the cloud computing environment is advantageous, in some embodiments, as it allows to apply a policy across multiple cloud computing environments in a manner which is reliable and equal. Furthermore, when an exception is generated to a policy, the exception is applied equally to all cloud computing environments, according to an embodiment. In some embodiments, this is advantageous as it allows maintaining a single policy which is applied to each representation of different cloud computing environments, where the alternative is to store and maintain a different policy for each cloud computing environment, as different infrastructures require different coding, different condition setting, etc. Thus, according to an embodiment, an advantage of the teachings herein is reduced storage requirements for policies applied to multiple computing environments.

In this regard, it is recognized that a human can apply a condition to a representation of a cloud computing environment and determine an outcome. However, it is also realized that a human cannot perform this task repeatedly in a manner which is reliable, at least for the reason that a human cannot apply objective criteria in a reliable manner. Rather, a human applies subjective criteria, which would result in a policy being applied unequally across multiple cloud computing environments. Furthermore, for cybersecurity applications, speed in application is of essence. A human applying a condition to a representation of each cloud entity in a cloud computing environment would simply not be able to complete the task in any meaningful timeframe, resulting in a cloud computing environment which is exposed for too long, and allowing a bad actor to take advantage of such an exposure. An embodiment of the present disclosure solves at least this by providing a system which applies a policy in a reliable, consistent manner using objective criteria, equally across multiple cloud computing environments.

FIG. 1 is an example network diagram 100 utilized to describe the various disclosed embodiments. In an embodiment, two cloud environments are illustrated for simplicity, though it should be readily apparent that different configurations are utilized in other embodiments without departing from the scope of this disclosure.

A production environment 110 is deployed in a first cloud computing infrastructure, according to an embodiment. The first cloud computing infrastructure is, for example, Amazon® Web Services (AWS), Google® Cloud Platform (GCP), Microsoft® Azure, and the like. In an embodiment, the production environment 110 is implemented as a virtual private cloud (VPC) in AWS. In certain embodiments, a production environment 110 is utilized as the main environment from which an organization operates, and is configured to provide a service, such as a software, expose a resource, and the like.

A production environment 110 is differentiated from a staging environment, for example, which is substantially identical to the production environment, but is used for testing purposes in order to test services, workloads, policies, and the like, before implementing them in a production environment, according to an embodiment.

In an embodiment, a production environment 110 includes a plurality of resources. A resource is a workload, such as a serverless function 112, a virtual machine 114, a software container cluster 116, and the like, according to an embodiment. In certain embodiments, the production environment 110 includes a plurality of each of a different resource type. A serverless function 112 is, for example, Amazon® Lambda, a virtual machine 114 is, for example, Oracle® VirtualBox, and a container cluster 116 is implemented using a Kubernetes® platform, according to some embodiments.

In certain embodiments, the production environment 110 further includes a principal (not shown) which operates on a resource. A resource may also be a principal, when operating on another resource, in certain embodiments. A principal is, for example according to an embodiment, a user account, a service account, a role, and the like. In certain embodiments, workloads are configured to be spun up (i.e. provisioned by an orchestrator, not shown), spun down, and the like, as the production environment 110 requires.

For example, a content delivery network (CDN) is a type of production environment which is configured to spin up load balancers and content servers as needed to provide a content, such as when a particular content (e.g., a video) is popular and access is attempted simultaneously from many different client devices. Each workload (in this example, a load balancer, a content server, etc.) is subject to security policies, which are stored, for example, in the production environment 110, in some embodiments.

In certain embodiments, where a workload is determined to be in violation of a policy, an alert is generated, as discussed below. For example, where a workload runs an application which has an outdated version number, an alert is generated, according to some embodiments.

In an embodiment, an alert is generated by a service, for example deployed as the serverless function 112. In some embodiments, the service is configured to monitor a workload in the production environment 110 and generate an alert based on a policy of a plurality of predetermined policies.

In some embodiments, the production environment 110 is communicatively coupled with a security environment 130. In an embodiment, the security environment 130 is implemented as a VPC on top of a cloud computing infrastructure, such as AWS. In an embodiment, the production environment 110 and the security environment 130 are implemented using the same cloud computing infrastructure (e.g., both on GCP).

In certain embodiments, the security environment 130 includes an assessment manager 132, a graph database 134, and a policy engine 136. In an embodiment, the graph database 134 is configured to store thereon a security graph. In certain embodiments, the security graph includes a representation of a computing environment. The graph database 134 is discussed in more detail with respect to FIG. 2 below, which includes an example of a portion of a security graph. In an embodiment, the security environment 130 further includes a plurality of inspector workloads (not shown). In certain embodiments, each inspector is configured to detect a cybersecurity object in a workload of the production environment 110. For example, in an embodiment, a cybersecurity object is a malware signature, an encryption key, a certificate, a password, a misconfiguration, a vulnerability, an exposure, a combination thereof, and the like.

In an embodiment, the assessment manager 132 and the policy engine 136 are each implemented as a workload, such as a node in a software container cluster. In certain embodiments, the assessment manager 132 is configured to generate a cloud assessment report, for rendering on a user interface of a computing device (not shown). In some embodiments, the cloud assessment report is generated based on applying a plurality of policies on a representation of a computing environment in a security graph, each policy including a query which is executable on the security graph stored in the graph database 134.

In certain embodiments, a query is generated, for example, to detect a software container which is externally exposed with cleartext SSH private keys. Such a software container allows lateral movement to occur, if compromised. In an embodiment, the assessment manager 132 is configured to periodically execute a query, a plurality of queries, and the like.

In an embodiment, a policy engine 136 includes a plurality of policies, which are applied to resources, principals, and the like, in the production environment 110. In some embodiments, a policy includes a conditional statement, such as "if a machine runs an outdated software application then an alert is generated having a medium severity". It should be understood that the former example is declaratory in nature, and embodiments where a rule is implemented based on a structured language are possible. In an embodiment, the policy engine 136 includes a plurality of queries, each query corresponding to a policy. In some embodiments, the policy engine 136 is configured to execute the queries on the security graph stored in the graph database 134 in order to determine if a resource, a principal, a combination thereof, and the like, violate a policy corresponding to a query.

For example, in an embodiment, a vulnerability exists on a database, which for a first organization (i.e., a first production environment) is critical, but for another organization (i.e., a second production environment) the same type of database may be used only for redundancy, making the same vulnerability there, less critical.

However, in certain embodiments, some vulnerabilities are considered as threats, regardless of the computing environment, the computing environment type, and the like. In some embodiments, having a predetermined set of policies implemented by the assessment manager 132 is further useful in order to ensure that where an organization utilizes multiple cloud platforms, policies are applied equally across an organization's entire cloud computing infrastructure.

For example, in an embodiment, an organization has a first production environment implemented on Microsoft® Azure, and a second production environment on Google® Cloud Platform (GCP). It is beneficial to have a single assessment manager ascertain that both environments adhere to the same level of basic security, for example by applying cybersecurity policies on the environments, on a representation of the environments, and the like.

In certain embodiments, each computing environment has its own policy exceptions. For example, in an embodiment, a first policy includes a rule having a condition which needs to be satisfied by a plurality of cloud entities, and a further condition including an exemption of a first cloud entity. Having a single baseline for cybersecurity ensures that the overall security of the organization is maintained.

Figure 2:
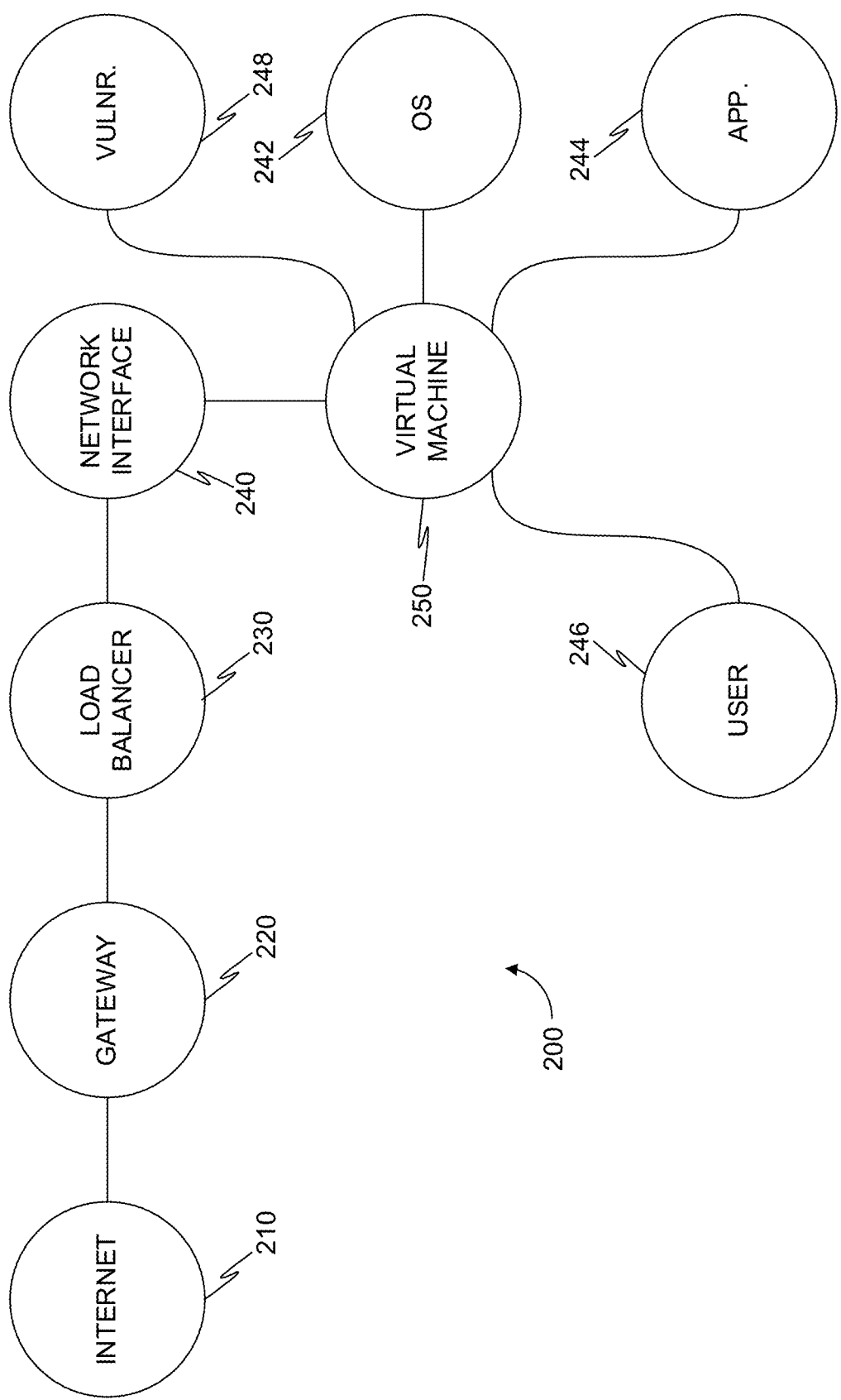
FIG. 2 is a security graph portion, implemented in accordance with an embodiment

FIG. 2 is an example of a security graph 200 portion, implemented in accordance with an embodiment. In an embodiment, a security graph 200 represents a computing environment, such as the production environment 110 of FIG. 1 above, in a graph database, according to a predefined data schema. In some embodiments, a cloud computing environment is represented in a graph database by mapping resources, principals, enrichments, and the like, to nodes in the security graph 200 and generating connections between the generated nodes. For example, in an embodiment, a resource node 220 represents a resource, such as a workload (e.g., a virtual machine, a software container, a serverless function, an application, and the like). In some embodiments, a principal node 246 represents a user account, a service account, a role, and the like. In an embodiment, an enrichment node represents an endpoint, for example having access to a public network (e.g., the Internet), a vulnerability, other attributes of a workload, and the like.

In an embodiment, an enrichment node 210 represents internet access, such that any node which is connected (e.g., by an edge) to the enrichment node 210, represents a resource which is capable of accessing the internet. In an embodiment, a resource node 220 represents a gateway workload, which is implemented, for example, as a node in a software container cluster. In certain embodiments, a second resource node 230 represents a load balancer workload, which is connected by an edge to the resource node 220 representing the gateway, and to a network interface node 240, which represents a network interface.

In an embodiment, the network interface node 240 is connected to a resource node 250 which represents a virtual machine, such as the virtual machine 114 of FIG. 1. In an embodiment, the virtual machine 114 includes, for example, an operating system (OS) represented by OS node 242, an application which is executed on the OS of the virtual machine 141, represented by application node 244, a user account node 246 which represents a user account, the user account having access to the virtual machine 114, and a vulnerability node 248, which represents a vulnerability which was detected as being present on, or pertaining to, the virtual machine 114.

For example, in an embodiment, an inspector is configured to inspect a disk of the virtual machine 114 for a cybersecurity threat, such as a vulnerability. In response to detecting the vulnerability, the inspector is configured to generate a node representing the vulnerability in the security graph 200, and generating a connection between the node representing the vulnerability (i.e., vulnerability node 248) and the resource node 250 which represents the virtual machine, according to an embodiment. A vulnerability is, in an embodiment, an outdated software, a specific open port, a user account with excessive permissions, a combination thereof, and the like.

Generating a node representing a vulnerability allows for a compact representation of the computing environment. Rather than store, for each node, data which describes the same vulnerability, that data is stored as a single node, and each node representing a resource which has the same vulnerability is connected to the vulnerability node. Thus, redundant information is not stored, allowing less storage space utilized, resulting in a compact representation without loss of information.

Figure 3:
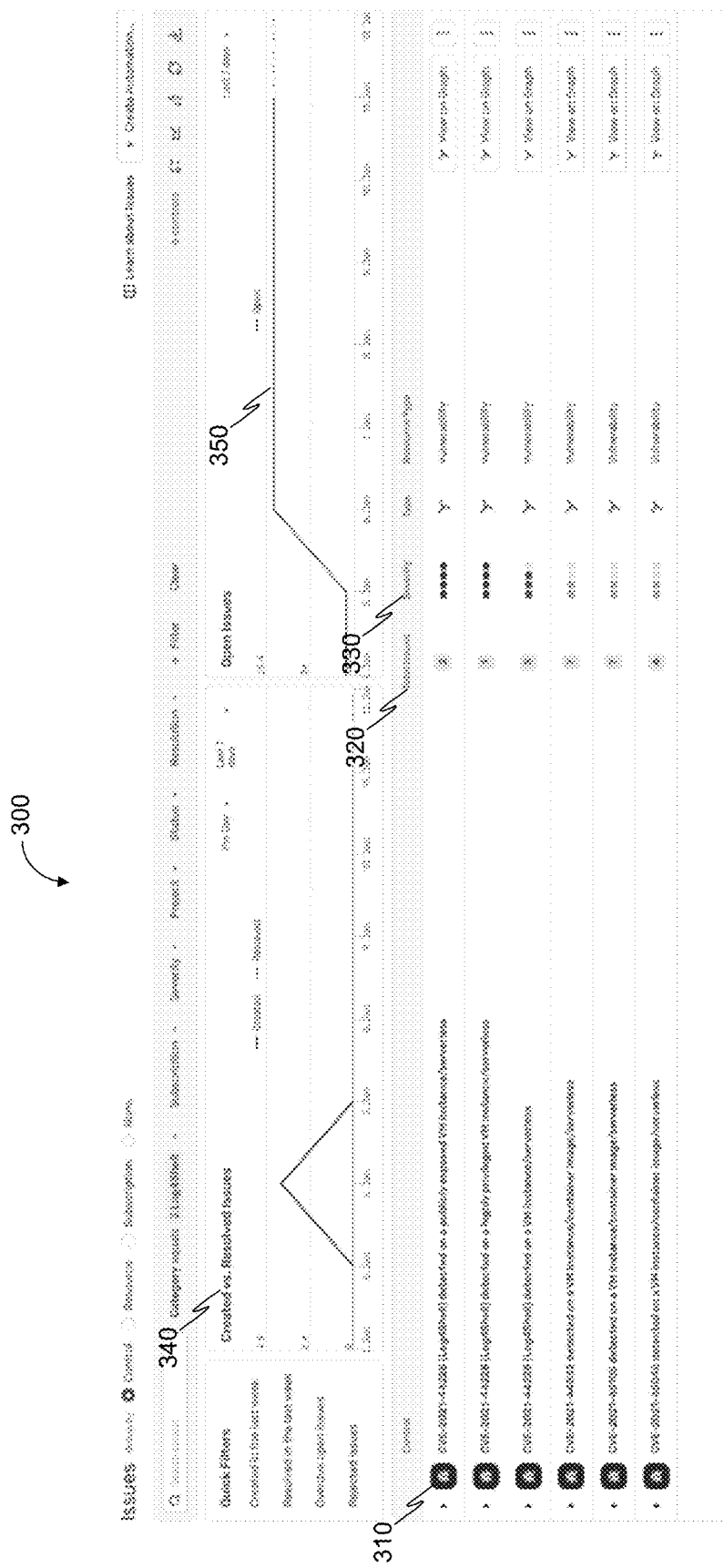
FIG. 3 is a user interface for displaying a cloud security assessment report, implemented in accordance with an embodiment.

FIG. 3 is an example of a user interface 300 for displaying a cloud security assessment report, implemented in accordance with an embodiment. In certain embodiments, the assessment manager 132 of FIG. 1 above is configured to generate instructions which when executed render the user interface 300. In an embodiment, the user interface 300 includes a plurality of alerts, such as first alert 310, and corresponding severity, such as first severity 330. For each of the plurality of alerts, a number of total issues (i.e., how many instances the alert has occurred) is counted, and an aggregate value 320 is displayed.

For example, in an embodiment, the first alert 310 is generated in response to an inspector detecting a vulnerability on a workload, where the vulnerability information is retrieved from an external database, such as Common Vulnerabilities and Exposures (CVE®).

For example, in an embodiment, the first alert 310 the alert is based on CVE-2021-44228. This indicates that the vulnerability was detected on a publicly exposed virtual machine. In certain embodiments, the first alert 310 is generated further based in response to receiving a result of a query executed on a security graph. In some embodiments, the query, when executed, generates a result including an identifier of a node representing a virtual machine, which is connected to another node which represents the CVE-2021-44228 vulnerability (widely known as the Log4Shell vulnerability).

In certain embodiments, the user interface 300 further includes a widget 340 configured to display a number of issues created, a number of issues resolved, and the like. In some embodiments, the number of issues is plotted on a graph as a function of time and rendered on the user interface 300. The user interface 300 also includes, in an embodiment, a widget 350 to display the number of open issues as a function of time.

Figure 4:
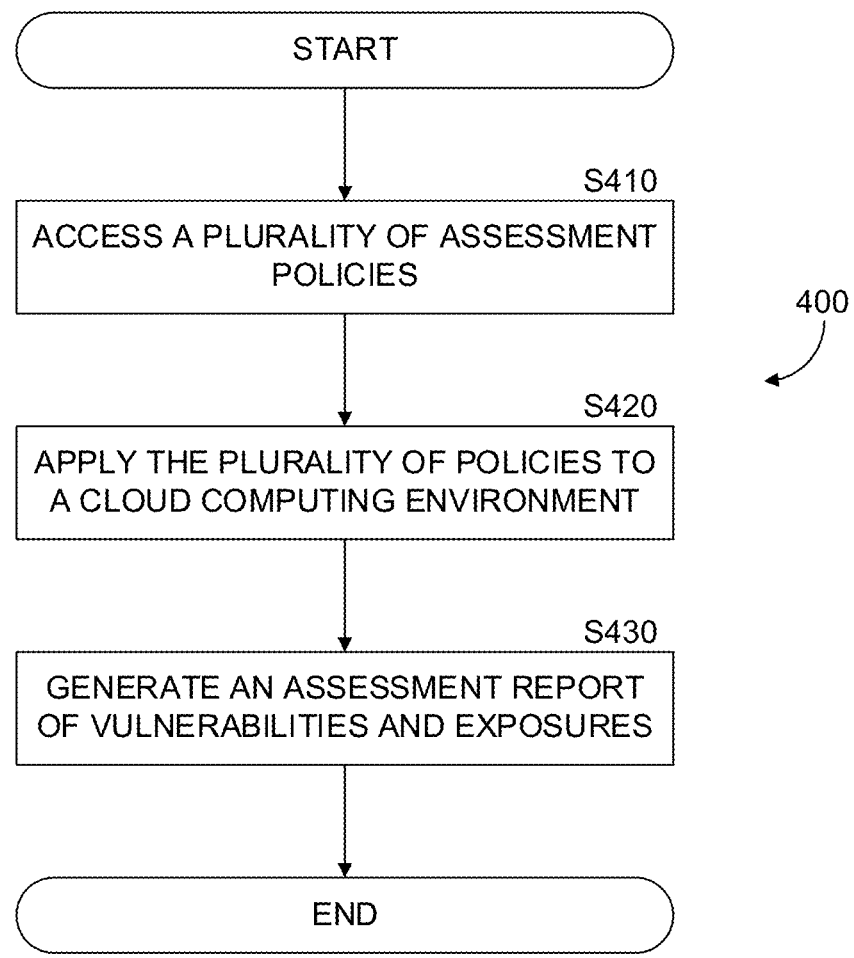
FIG. 4 is a flowchart of a method for performing a risk assessment for a cloud environment, implemented in accordance with an embodiment.

FIG. 4 is a flowchart of a method for determining contextual risk for a cloud computing environment and initiating mitigation thereof, implemented in accordance with an embodiment.

At S410, an assessment policy is accessed. In an embodiment, a plurality of assessment policies are accessed. In some embodiments, the plurality of assessment policies are stored in a policy engine, and accessed by an assessment manager. In certain embodiments, each assessment policy further includes a query which is executable on a security graph. According to an embodiment, the query is executed in order to generate a result, in which a cloud entity is detected which is in violation of the policy associated with the query.

In some embodiments, accessing an assessment policy includes accessing a policy engine to extract a policy for a cloud computing environment. In certain embodiments, the policy includes a conditional rule, based on which a query is generated. For example, in an embodiment the conditional rule includes a cloud entity type value (e.g., a workload), and a query is generated which when executed on a security graph returns an identifier of a cloud entity, based on detecting a node representing the cloud entity based on the value of the cloud entity type.

In an embodiment, a cloud entity is, for example, a workload type (e.g., a virtual machine, a software container, a serverless function, etc.), an application type (e.g., a gateway, a load balancer, etc.), a principal (e.g., a user account, a service account, etc.), an enrichment, a vulnerability, and the like.

At S420, a policy is applied on a cloud computing environment. In some embodiments, a plurality of polices are applied to a cloud computing environment. In an embodiment, the plurality of policies are applied periodically, at predetermined times, in response to a user generated request, a combination thereof, and the like. In certain embodiments, a policy, a plurality of policies, and the like, are applied on a plurality of cloud computing environments. In an embodiment, a first cloud computing environment is deployed on a first cloud computing infrastructure (e.g., AWS) and a second cloud computing environment is deployed on a second cloud computing infrastructure (e.g., GCP). By applying a policy on a representation of the cloud computing environments in a security graph, the same policy can be equally applied to each cloud computing environment, without having to maintain a similar policy for each cloud computing environment separately.

In certain embodiments, applying a policy includes querying a security graph based on a query associated with the policy. The query generates an output that can include, in an embodiment, additional nodes which are connected the node that is returned from the query. In the example above, a traversing the graph to detect a vulnerability node returns a node which corresponds to a workload having the vulnerability, in accordance with an embodiment.

In certain embodiments, the query includes, for example, public exposure detection, vulnerability detection, database exposure, code vulnerability, endpoint detection, malware detection, misconfiguration detection, a lateral movement detection, an exposed secret, a combination thereof, and the like. In some embodiments, malware detection includes querying a security graph to determine if a workload is indicated as having malware.

For example, in an embodiment, a malware object is represented as a node in the security graph. In an embodiment, the malware object is detected, for example by an inspector which is configured to inspect the workload for the malware object, for example by detecting a signature of the malware object.

Thus, if a node representing the workload is connected in the security graph to the node representing the malware object, the workload is considered to have the malware object on it, according to an embodiment. In an embodiment, detecting a misconfiguration includes, for example, querying the security graph to determine if a database application is installed on a workload, which is not password protected. A password is represented, in an embodiment, as an attribute of a node representing the database, as a node of its own in the security graph, and the like. Where a workload node is detected which is connected to a database application node (i.e., a node which represents a database application), which in turn does not have a password attribute, is not connected to a password node, and the like, the output of such a query is that the workload node represents a misconfigured workload, in accordance with an embodiment.

At S430, a risk assessment report is generated. In an embodiment, the risk assessment report includes an output generated in response to querying the security graph. For example, in an embodiment the output includes an identifier of a workload deployed in the cloud environment, which is represented by a node in the security graph, the node having an attribute which satisfies a condition of the query.

In certain embodiments, the risk assessment report further includes a risk mitigation suggestion. In an embodiment, a risk mitigation suggestion is received from an external database, such as CVE®. In an embodiment, the risk mitigation suggestion includes instructions that when executed, initiate a mitigation action.

In some embodiments, the risk assessment report includes a first cybersecurity risk detected in a first cloud computing environment and in a second cloud computing environment. In certain embodiments, the risk assessment report includes a first cybersecurity risk detected in a first cloud computing environment, and a second cybersecurity risk detected in a second cloud computing environment.

At S440, a mitigation action is initiated. For example, in an embodiment, a mitigation action includes an instruction to install a software patch to overcome a known vulnerability, an instruction to revoke access to a network, an instruction to revoke access to a resource, an instruction to modify a permission of a principal, a combination thereof, and the like. In an embodiment the mitigation action is initiated in response to generating the risk assessment report. In certain embodiments, the risk assessment report includes a plurality of cybersecurity risks, ordered by a value of a severity index. In such embodiments, a plurality of mitigation actions are initiated, such that a first mitigation action is initiated before a second mitigation action, wherein the first mitigation action is initiated in response to a first cybersecurity risk having a severity index value which is higher than a second cybersecurity risk having a second severity index value, which corresponds to the second mitigation action.

In an embodiment, by initiating mitigation actions based on an order of severity, compute resources of a cloud computing environment are better utilized, by first addressing the most critical cybersecurity risks.

In some embodiments, a plurality of mitigations actions are initiated such that a first mitigation action is initiated in a first cloud computing environment, and a second mitigation action is initiated in a second cloud computing environment.

Figure 5:
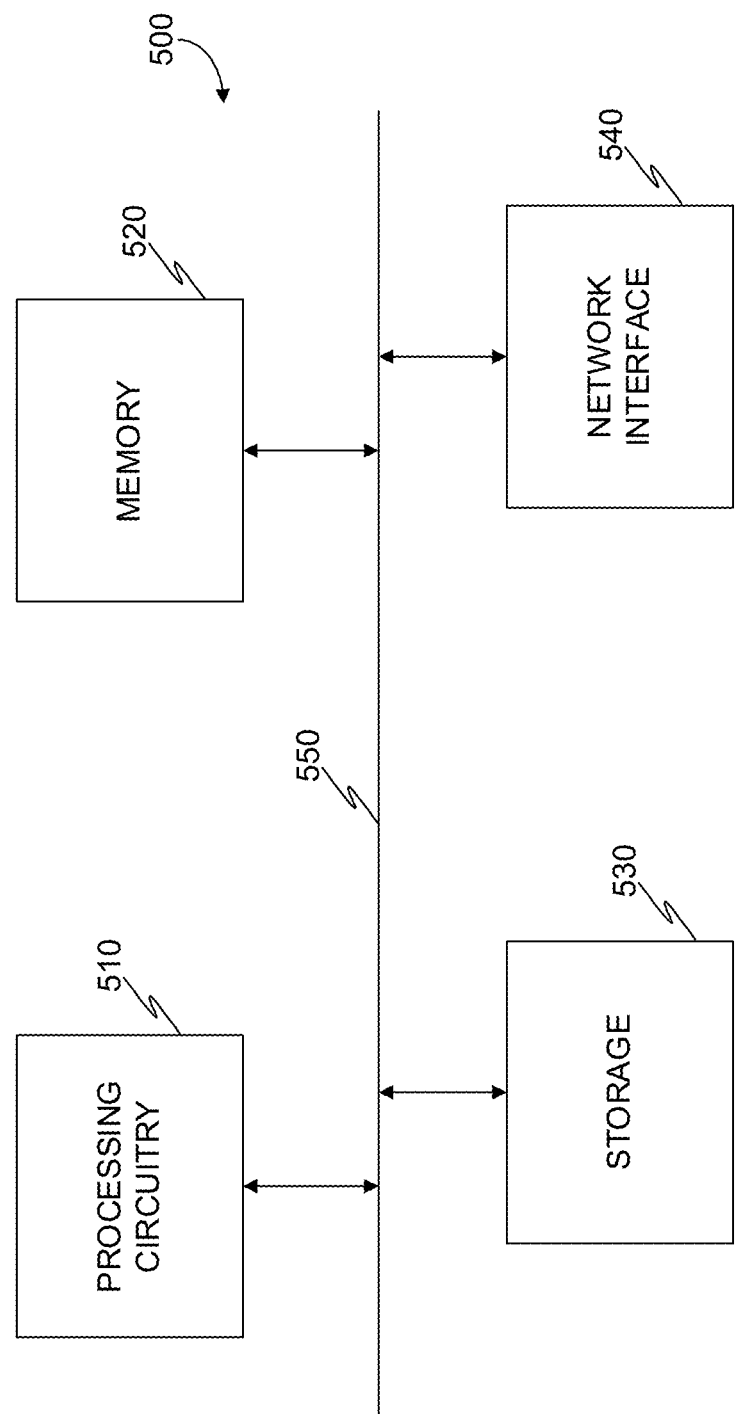
FIG. 5 is a schematic diagram of an assessment manager according to an embodiment.

FIG. 5 is an example schematic diagram of an assessment manager 132 according to an embodiment. The assessment manager 132 includes a processing circuitry 510 coupled to a memory 520, a storage 530, and a network interface 540. In an embodiment, the components of the assessment manager 132 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, or any other medium which can be used to store the desired information.

The network interface 540 allows the assessment manager 132 to communicate with, for example, a security graph, a cloud environment, a policy engine, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a contextual cloud risk assessment of a cloud computing environment, comprising:
    accessing a plurality of cloud assessment policies, wherein each cloud assessment policy of the plurality of cloud assessment policies includes a query executable on a security graph;
    applying the plurality of cloud assessment policies on the security graph, wherein the security graph is a representation of a first cloud computing environment;
    generating a risk assessment report based on an output generated by applying, on the security graph, a cloud assessment policy of the plurality of cloud assessment polices; and
    initiating a mitigation action based on a cybersecurity risk from the risk assessment report.

2. The method of claim 1, further comprising:
    applying the plurality of cloud assessment policies to a representation of a second cloud computing environment, wherein the second cloud computing environment is deployed on an infrastructure which is distinct from an infrastructure on which the first cloud computing environment is deployed, wherein the security graph includes a representation of a first cloud computing environment.

3. The method of claim 2, further comprising:
    initiating a first mitigation action in the first cloud computing environment; and
    initiating a second mitigation action in the second cloud computing environment.

4. The method of claim 1, further comprising:
    accessing a policy from a policy engine of the first cloud computing environment, the policy including a condition and a value; and
    generating a query corresponding to the policy, the query including the condition and the value.

5. The method of claim 1, further comprising:
    generating a severity index for the cybersecurity risk identified in the risk assessment report.

6. The method of claim 5, wherein initiating the mitigation action further comprises:
    initiating the mitigation action further based on the severity index.

7. The method of claim 5, wherein the severity index is generated further based on a received severity score corresponding to the cybersecurity risk.

8. The method of claim 1, further comprising:
    initiating an inspection for a cybersecurity object on a resource in the first cloud computing environment in response to determining that an identifier of the resource is included in the risk assessment report.

9. The method of claim 1, wherein the query includes any one of: public exposure detection, vulnerability detection, database exposure, code vulnerability, endpoint detection, malware detection, misconfiguration detection, a lateral movement detection, an exposed secret detection, and a combination thereof.

10. The method of claim 1, wherein the mitigation action includes any one of: initiating installation of a software patch, revoking access to a network, revoking access to a resource, modifying a permission of a principal, and a combination thereof.

11. A non-transitory computer readable medium having stored thereon instructions for causing a processing circuitry to execute a process, the process comprising:
    accessing a plurality of cloud assessment policies, wherein each cloud assessment policy of the plurality of cloud assessment policies includes a query executable on a security graph;
    applying the plurality of cloud assessment policies on the security graph, wherein the security graph is a representation of a first cloud computing environment;
    generating a risk assessment report based on an output generated by applying, on the security graph, a cloud assessment policy of the plurality of cloud assessment polices; and
    initiating a mitigation action based on a cybersecurity risk from the risk assessment report.

12. A system for generating a contextual cloud risk assessment of a cloud computing environment, comprising:
    a processing circuitry; and
    a memory, the memory containing instructions that, when executed by the processing circuitry, configure the system to:
    access a plurality of cloud assessment policies, wherein each cloud assessment policy of the plurality of cloud assessment policies includes a query executable on a security graph;
    apply the plurality of cloud assessment policies on the security graph, wherein the security is a representation of a first cloud computing environment;
    generate a risk assessment report based on an output generated by applying, on the security graph, a cloud assessment policy of the plurality of cloud assessment polices; and
    initiate a mitigation action based on a cybersecurity risk from the risk assessment report.

13. The system of claim 12, wherein the memory contains further instructions which, when executed by the processing circuitry, further configures the system to:
    apply the plurality of cloud assessment policies to a representation of a second cloud computing environment, wherein the second cloud computing environment is deployed on an infrastructure which is distinct from an infrastructure on which the first cloud computing environment is deployed, wherein the security graph includes a representation of a first cloud computing environment.

14. The system of claim 13, wherein the memory contains further instructions which, when executed by the processing circuitry, further configures the system to:
    initiate a first mitigation action in the first cloud computing environment; and
    initiate a second mitigation action in the second cloud computing environment.

15. The system of claim 12, wherein the memory contains further instructions which, when executed by the processing circuitry, further configures the system to:

access a policy from a policy engine of the first cloud computing environment, the policy including a condition and a value; and generate a query corresponding to the policy, the query including the condition and the value.

16. The system of claim 12, wherein the memory contains further instructions which, when executed by the processing circuitry, further configures the system to:

generate a severity index for a cybersecurity risk identified in the risk assessment report.

17. The system of claim 16, wherein the memory contains further instructions which, when executed by the processing circuitry to initiate the mitigation action, further configures the system to:

initiate the mitigation action further based on the severity index.

18. The system of claim 16, wherein the severity index is generated further based on a received severity score corresponding to the cybersecurity risk.

19. The system of claim 12, wherein the memory contains further instructions which, when executed by the processing circuitry, further configures the system to:

initiate an inspection for a cybersecurity object on a resource in the first cloud computing environment in response to determining that an identifier of the resource is included in the risk assessment report.

20. The system of claim 12, wherein the query includes any one of: public exposure detection, vulnerability detection, database exposure, code vulnerability, endpoint detection, malware detection, misconfiguration detection, a lateral movement detection, an exposed secret detection, and a combination thereof.

21. The system of claim 12, wherein the mitigation action includes any one of: initiating installation of a software patch, revoking access to a network, revoking access to a resource, modifying a permission of a principal, and a combination thereof.

* * * * *